(12) United States Patent
Ashbacher

(10) Patent No.: US 10,187,705 B2
(45) Date of Patent: Jan. 22, 2019

(54) MEDIA CONTENT MATCHING AND INDEXING

(71) Applicant: Sorenson Media, Inc., Draper, UT (US)

(72) Inventor: Andrew L. Ashbacher, Draper, UT (US)

(73) Assignee: Sorenson Media, Inc., Draper, UT (US)

( * ) Notice: Subject to any disclaimer, the term of this patent is extended or adjusted under 35 U.S.C. 154(b) by 0 days.

(21) Appl. No.: 15/728,687

(22) Filed: Oct. 10, 2017

(65) Prior Publication Data

US 2018/0035175 A1 Feb. 1, 2018

Related U.S. Application Data

(63) Continuation of application No. 15/081,738, filed on Mar. 25, 2016, now Pat. No. 9,813,781.

(Continued)

(51) Int. Cl.
*H04N 21/262* (2011.01)
*H04N 21/235* (2011.01)
*H04N 21/84* (2011.01)
*G06F 17/22* (2006.01)
*G06F 17/30* (2006.01)
*H04N 21/2187* (2011.01)

(Continued)

(52) U.S. Cl.
CPC ......... *H04N 21/84* (2013.01); *G06F 17/2235* (2013.01); *G06F 17/30784* (2013.01); *H04N 21/2187* (2013.01); *H04N 21/234* (2013.01); *H04N 21/262* (2013.01); *H04N 21/44004* (2013.01); *H04N 21/44008* (2013.01); *H04N 21/4622* (2013.01); *H04N 21/4882* (2013.01); *H04N 21/64707* (2013.01); *H04N 21/6582* (2013.01); *H04N 21/812* (2013.01); *H04N 21/8166* (2013.01)

(58) Field of Classification Search
CPC combination set(s) only.
See application file for complete search history.

(56) References Cited

U.S. PATENT DOCUMENTS 6,909,837 B1 6/2005 Unger
7,444,659 B2 10/2008 Lemmons
(Continued)

OTHER PUBLICATIONS

International Search Report and Written Opinion received for International Patent Application No. PCT/US16/53998, 13 pages, dated Dec. 28, 2016.

(Continued)

*Primary Examiner* — Kieu Oanh T Bui
(74) *Attorney, Agent, or Firm* — Honigman Miller Schwartz and Cohn LLP

(57) ABSTRACT

A method, system, or device determine when media content is to be displayed. The method can include receiving media content on a broadcast channel from a content feed. The method can also include receiving an identifier for upcoming media content from an automatic content recognition (ACR) system in response to a trigger event. The method can include receiving overlay content from an overlay content server. The method can include storing the overlay content at a memory device. The method can include determining a time that the media content is to be displayed using the identifier.

20 Claims, 5 Drawing Sheets

Related U.S. Application Data

(60) Provisional application No. 62/247,060, filed on Oct. 27, 2015.

(51) Int. Cl.

| | | |
|---|---|---|
| *H04N 21/234* | (2011.01) | |
| *H04N 21/44* | (2011.01) | |
| *H04N 21/647* | (2011.01) | |
| *H04N 21/81* | (2011.01) | |
| *H04N 21/462* | (2011.01) | |
| *H04N 21/488* | (2011.01) | |
| *H04N 21/658* | (2011.01) | |

(56) References Cited

U.S. PATENT DOCUMENTS

| | | |
|---|---|---|
| 7,546,619 B2 | 6/2009 | Anderson et al. |
| 2004/0218103 A1 | 11/2004 | Onomatsu |
| 2005/0138658 A1 | 6/2005 | Bryan |
| 2006/0190654 A1 | 8/2006 | Joy et al. |
| 2008/0104636 A1 | 5/2008 | Tanaka |
| 2010/0033574 A1 | 2/2010 | Ran et al. |
| 2010/0066759 A1 | 3/2010 | Zhang |
| 2011/0064385 A1 | 3/2011 | Gharaat et al. |
| 2013/0024894 A1 | 1/2013 | Eyer |
| 2013/0031582 A1 | 1/2013 | Tinsman et al. |
| 2013/0160038 A1 | 6/2013 | Slaney et al. |
| 2013/0204889 A1 | 8/2013 | Sinha et al. |
| 2013/0205315 A1 | 8/2013 | Sinha et al. |
| 2013/0205317 A1 | 8/2013 | Sinha et al. |
| 2013/0276010 A1 | 10/2013 | Drayson |
| 2013/0308818 A1 | 11/2013 | MacIntosh et al. |
| 2013/0312018 A1 | 11/2013 | Elliott et al. |
| 2014/0007162 A1 | 1/2014 | Harrison |
| 2014/0196085 A1 | 7/2014 | Dunker et al. |
| 2014/0250450 A1 | 9/2014 | Yu et al. |
| 2014/0282657 A1 | 9/2014 | Sinha et al. |
| 2015/0067147 A1 | 3/2015 | Carmel et al. |
| 2016/0316261 A1* | 10/2016 | Koshevoy ........ H04N 21/44008 |

OTHER PUBLICATIONS

Lopez-Nores, Martin, et al., "MiSPOT: Dynamic Product Placement for Digital TV through MPEG-4 Processing and Semantic Reasoning," Knowledge and Information Systems at 22, No. 1, pp. 101-128 (2009).

Gracenote, "Gracenote Takes on Targeted Advertising," at http://www.gracenote.com/events/targeted_advertising/, accessed Nov. 6, 2014.

International Search Report and Written Opinion received for International Patent Application No. PCT/US16/28583, 11 pages, dated Jul. 22, 2016.

* cited by examiner

MEDIA CONTENT MATCHING AND INDEXING

CROSS-REFERENCE TO RELATED APPLICATIONS

This U.S. patent application is a continuation of, and claims priority under 35 U.S.C. § 120 from, U.S. patent application Ser. No. 15/081,738, filed on Mar. 25, 2016, which claims priority under 35 U.S.C. § 119(e) to U.S. Provisional Application No. 62/247,060, filed Oct. 27, 2015. The disclosures of these prior applications are considered part of the disclosure of this application and are hereby incorporated by reference in their entireties

BACKGROUND

Media consumption devices, such as smart televisions (TVs), may access broadcast digital content and receive data, such as streaming media, from data networks. Streaming media refers to a service in which an end user may request media content, such as movies or news, over a telephone line, a cable channel, an Internet channel, and so forth. For example, a user may view a movie without having to leave their residence. In addition, users may access various types of educational content, such as video lectures, without having to attend a physically class at a school or an educational institution.

As the number of media consumption devices continues to increase, video content generation and delivery may similarly increase. With an increase in use of media consumption devices that access the broadcast digital content and the streaming media, content providers or network providers may distribute contextually relevant material to viewers that are consuming the broadcast digital content or the streaming media. For example, local broadcasters may include contextually relevant advertisements and interactive content with the broadcast digital content or the streaming media.

BRIEF DESCRIPTION OF THE DRAWINGS

The disclosure will be understood more fully from the detailed description given below and from the accompanying drawings of various embodiments of the disclosure. The drawings, however, are not to be taken to limit the disclosure to the specific embodiments, but are for explanation and understanding only.

DETAILED DESCRIPTION

Figure 1:
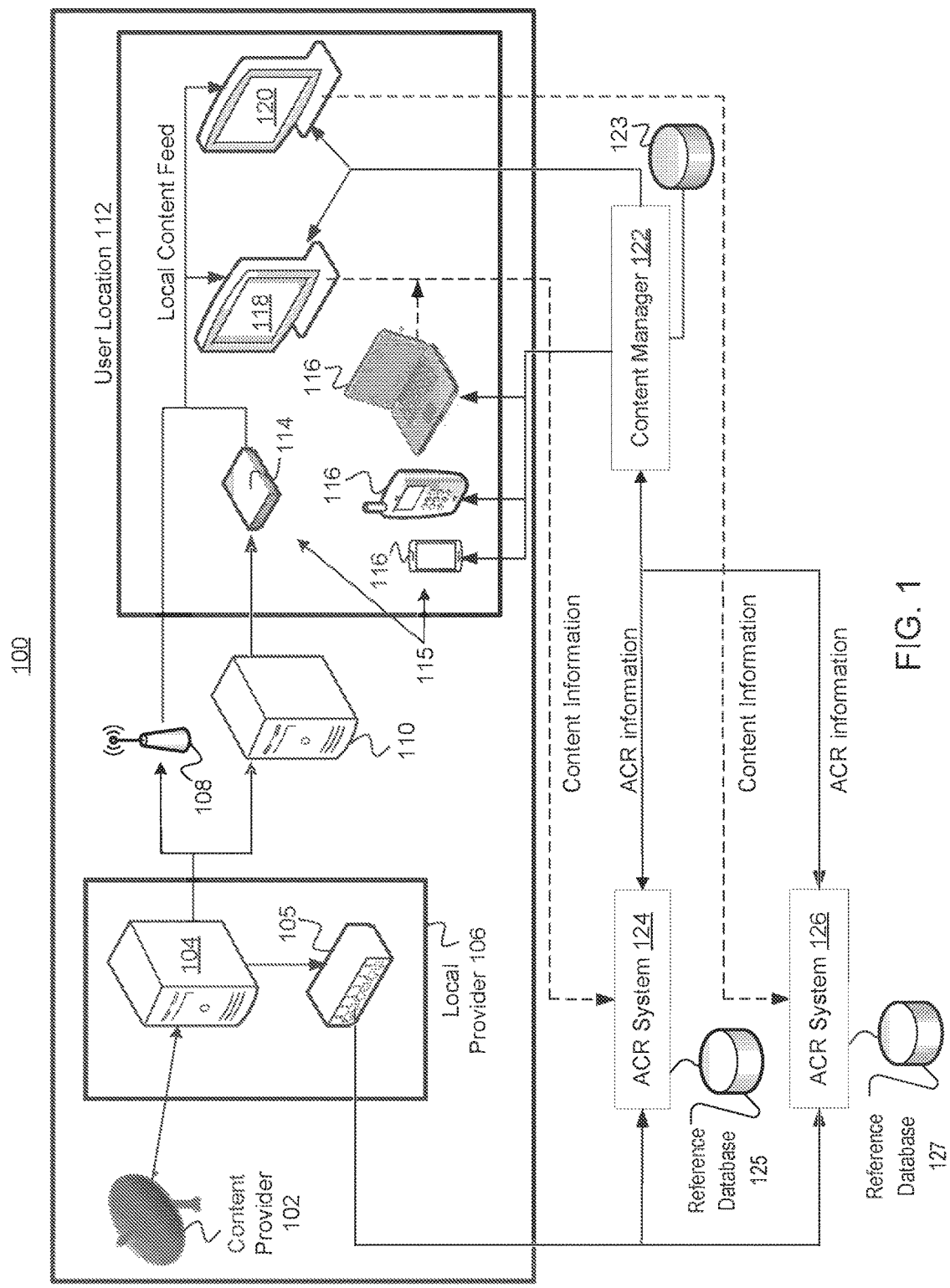
FIG. 1 illustrates a system diagram of a content distribution network according to one embodiment.

Currently, there are several hundred program choices offered by cable television (TV) providers and satellite providers. In addition, there are over one hundred major television market areas with dozens of local television channels. A content provider or broadcaster may generate content feeds at a central location and distribute the content feeds to a variety of locations. For example, a content provider may distribute a television channel to a number of network providers. The network providers can be local broadcasters, multi-channel networks, and other content owners or distributors.

The word "content" can refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. An example of a type of content commonly referred to as a type of media is a "motion picture" referred to as "a film."

Media content broadcasting or streaming, such as TV show or internet show broadcasting, may be an engaging venue to advertise products and services, provide information to viewers, or any combination thereof. To create revenue to provide numerous programming choices, content providers (such as television networks) can insert advertisements (ADs) into media content. Conventionally, advertisers have relied on sending one video stream to all the viewers of a channel, with the only targeting being performed by the local broadcasters based on an audience analysis and ratings providers, such as ratings provided by The Nielsen Company®.

Broadcasters, content providers, and advertisers want to know what programs or channels individual viewers are watching. The broadcasters, content providers, and advertisers may also want to know when the individual viewers are watching the programs or channels. The broadcasters, content providers, and advertisers can use this information to target subject matter and a timing of ADs or commercials to viewers. For example, broadcasters want to target ADs and other non-commercial information to specific viewers. Non-commercial may include news alerts, announcements, educational information, and so forth.

While TV advertising is an engaging venue to advertise products or services, conventional TV advertising lacks targeted and personalized advertising. Additionally, conventional TV advertising does not enable retargeting or further engagement of viewers once the viewers have watched a commercial. For example, to reach a viewer with a TV AD, conventional TV advertising assumes a viewer is watching the same channel for a period of time. In this example, a content provider or advertiser will show the TV AD within the period of time. In another example, to reach a viewer with the TV AD, a content provider or advertiser will use conventional TV advertising and show the TV AD repeatedly over a period of time. In this example, the content provider or the advertiser assumes the viewer will see the TV AD within the period of time. However, these assumptions are often incorrect and can cause a viewer to miss viewing the TV AD at all. Alternatively, these assumptions can cause viewer to see the same TV AD multiple times, but the multiple viewings can have a negligible effect on the customer's intent to purchase a product shown in the TV AD. It would therefore be advantageous to determine what program a viewer is watching or is about to watch and send an identifier correlating to the program information to an overlay content server or an electronic device. The electronic device or overlay content server can use the identifier to target ADs to a viewer.

To make this determination, an ACR system can generate query fingerprints from media content (e.g., a media program or channel) a user is watching using automatic content recognition (ACR). The ACR system may compare query fingerprints with stored fingerprints within a database to determine a match. This database can be stored at a server. In one example, the server can be an ACR server.

The electronic device can send the query fingerprints to the server. The server can find one or more matches between the query fingerprints and the stored fingerprints. In one example, when the ACR server finds a match, the ACR server can identify the channel that the TV program that is currently being streamed on. In another example, when the ACR server finds a match, the ACR server can identify the channel that the TV program is going to be streamed on. The server may then send a message to a requesting entity identifying the media content. The requesting entity may be a smart TV or the overlay content server. The smart television can include a processing device and radio frequency (RF) circuitry. The processing device can execute an operating system (OS) and/or one or more applications, such as applications to access video-on-demand (VOD) content. The processing device can use an antenna of the radio frequency (RF) circuitry to communicated on a wireless local area network (WLAN). In one example, the processing device can use the RF circuitry to connect to the internet to access online interactive media or on-demand streaming media.

The requesting entity may use the identified media content to select overlay content that can be display to a user. The requesting entity may replace or overlay the different overlay media content on top of the media content currently an electronic device is displaying to the viewer. In one example, the requesting entity can replace or overlay the media content the electronic device is currently displaying to the viewer during a commercial break. In another example, the requesting entity may replace or overlay the media content the electronic device is displaying to the viewer during a regularly scheduled program.

Because knowledge of the channel is time sensitive as commercial time slots change with different channels, an electronic device (such as a TV or set-top box) queries the server continuously or periodically. In one example, the electronic device can query the server every second. In another example, the electronic device can query the server every several seconds. Conventionally, an ACR system fingerprints media content from the content feed and a reference database stores the fingerprints. The user electronic device may perform local ACR fingerprint matching using the reference database. For example, the media content fingerprinting occurs at a broadcast facility and then the electronic device performs local ACR fingerprint matching. However, the broadcast facility performing the fingerprinting and the electronic device performing the ACR fingerprint matching can result in detecting ADs and other media content only at the time of viewing without any advanced detection.

Described herein are methods, systems, and devices for matching fingerprints stored in a reference database with fingerprints generated from media content a user is watching while indexing the existing fingerprints in a reference database. By matching the fingerprints while indexing the existing fingerprints, an electronic device can detect content segments within other media content. In one example, the electronic device can index a live broadcast feed several seconds before the electronic device displays the live broadcast feed. One advantage of matching during indexing is to alert an electronic device of upcoming content. Another advantage of matching during indexing is to provide the electronic device analytics about how many channels and which channels have aired specific commercials or video clips.

In one example, an electronic device may include a computer-readable storage medium storing instructions. The computer-readable storage medium can be non-transitory. The electronic device can include processing logic to execute the instructions to generate a first fingerprint for media content a user is consuming. In another example, a method may include storing instructions on the computer-readable storage medium and executing the instructions by the processing logic to generate a query fingerprint for media content a user is consuming. The processing logic may include hardware (e.g., circuitry, dedicated logic, programmable logic, microcode, etc.), software (e.g., instructions executed by a processing device), firmware or a combination thereof. The electronic device can send the query fingerprint to a server. The server can send an identifier for a first channel a viewer is watching to the electronic device in response to the server finding a match between the query fingerprint and a media content fingerprint in a database. The electronic device may continuously receive multiple fingerprints from the server that are generated from the media content in locations in a broadcast chain that proceed where the user will view the media content. The electronic device can store the multiple fingerprints in a local database of the computer-readable storage medium.

The electronic device or server may send an identification of the channel to a look-up server that identifies the media content the user is watching. The look-up server may then send an identifier to an overlay content server indicating what media content the electronic device is displaying. The overlay content server can send media content to a look-up server, where the media content is contextually relevant to a subject matter of the media content. The overlay content server may deliver the media content to the electronic device for display as overlay content. In one embodiment, the overlay content can be media content that an ACR system overlays or superimposes on top of media content an electronic device is displaying to a viewer. In another embodiment, the overlay content can be media content that replaces media content an electronic device is displaying to a viewer, e.g., replacement media content. In one example, the overlay content server can store the overlay content. In another example, the overlay content server can be coupled to a memory device (such as another server) that can store the overlay content. In this example, the overlay content server can retrieve the overlay content from the memory device and send it to the electronic device. Alternatively, the ACR system can overlay the overlay content on top of a portion of the media content the electronic device is currently displaying to the viewer. For example, overlay content may be overlayed on top of a media content that refers to the subject matter of the media content.

To provide viewers with media content, an individual or an organization may decide to stream the media content to viewers, such as by delivering the media content over the Internet to the viewers. The media content used by the individual or the organization may be media content acquired from one or more live broadcast media feeds. For example, a media content provider may provide a user with a linear media channel. The linear media channel can be a live media feed source provided to a viewer over the Internet.

FIG. 1 illustrates a system diagram of a content distribution network 100 according to one embodiment. In the content distribution network 100, a content provider 102 may broadcast a content feed to a local provider 106. The local provider 106 may include a headend 104 and an ACR fingerprinter server 105. The headend 104 of the local provider 106 can receive a content feed from the content provider 102. The headend 104 may generate a local content feed based on the received content feed. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 may be installed inside the broadcast facility in order to fingerprint a feed in advance of that feed being delivered to a display device, such as a television (TV).

The OTA broadcaster 108 and/or the MVPD 110 may communicate the local content feed to electronic devices 115. Some examples of the electronic devices 115 include electronic devices 118 and 120, a set top box 114 that streams media content to the electronic devices 118 and 120, as well as other devices 116 through which the user may stream the local content feed, e.g., wirelessly.

In one example, the OTA broadcaster 108 may broadcast the local content feed using traditional local television channels or radio channels. In this example, the electronic devices 118 and 120 may include antennas (such as TV antennas or radio antennas) to receive the local content feed. In another example, the MVPD 110 (such as a cable broadcaster or a satellite broadcaster) may communicate the local content feed to a set top box 114. In this example, the set top box 114 may format the content feed for the electronic devices 118 and 120 and may communicate the formatted content feed to the electronic devices 118 and 120. The electronic devices 118 and 120 may include a display device, such as a television screen or a touch screen, to display the local content to a viewer. Various components of the content distribution network 100 may be integrated or coupled to the electronic devices 118 and 120. For example, the electronic devices 118 and 120 can be smart televisions that include the antennas, the set top box 114, and the display device in a single unit.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 104 can be to enable entities such as advertisers, advertising agencies, and content providers to interface with a single platform and deliver advanced advertising and content experiences to electronic devices from multiple CEMs.

In one example, the ACR system 124 can be coupled to a reference database 125. In another example, the ACR system 126 can be coupled to a reference database 127. The reference databases 125 and 127 can store fingerprints and media content. The content manager 122 can be a server component that receives messages from the ACR system 124 and/or 126. The messages can include information indicating media content that the electronic device 118 or 120 is going to display or is currently displaying. In one example, in response to the content manager 122 receiving the message, the content manager 122 can record an impression or association between the electronic device 118 or 120 and the media content stored in the database 123. In another example, in response to the content manager 122 receiving the message, the content manager 122 can query or search the database 123 for available content overlays for the media content. The content manager 122 filters the content overlays using the device information for the electronic device 118 or 120. The content manager 122 can send a content overlay, via the ACR system 124 or 126, to the electronic device 118 or 120. In one embodiment, the electronic device 118 or 120 can display the content overlay to a viewer. In another embodiment, the electronic device 118 or 120 can replace the media content with the overlay content and display the overlay content to a viewer. In another example, the ACR system 124 or 126 can cause triggers to be displayed on the electronic device 118 or 120. The electronic device 118 or 120 can recognize the triggers and send a request to the content manager 122 to record an impression or association between the electronic device 118 or 120 and the media content in the database 123. For example, the electronic device 118 or 120 can send a request to the content manager 122 to record whether a viewer changes a channel when the electronic device 118 or 120 displays select media content.

The automatic content recognition may be performed in a distributed architecture as described herein. In one embodiment, the ACR client 225 can reside on any of the electronic device 115, 118, or 120. In one embodiment, the ACR client 225 can perform automatic content recognition. In another embodiment, a local ACR system or a local ACR fingerprint matcher integrated into can perform the automatic content recognition. In another embodiment, the ACR client 225 may perform ACR fingerprint matching as described herein. In another embodiment, the ACR client 225 can be a client-side matching component.

The electronic devices 115, 118, or 120 can be a media device, such as a television, mobile phone, or dongle. The ACR client 225 can be software or firmware that executes or runs on the electronic devices 115, 118, or 120. The ACR client 225 can fingerprint media content (such as audio content, video content, closed captions, emergency messages, and so forth) during a playback of the media content. The ACR client 225 can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR client 225 with the ACR fingerprint server 105 in greater detail.

The ACR fingerprint server 105 may analyze the local content feed that may include an ordered sequence of frames from the local content feed and capture fingerprints. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126. The ACR systems 124 and 126 may establish communication connections with the different electronic devices 115. The electronic devices 115 may communicate fingerprint information to the ACR systems 124 and 126, respectively. When the ACR system 124 or 126 receives ACR fingerprint information from the electronic devices 115, the ACR system 124 or 126 may match the received fingerprints with those generated by the ACR fingerprint server 105. When a match occurs and the ACR system 124 or 126 identifies content, the ACR system 124 or 126 may communicate ACR events to a content manager 122.

In another example, the ACR system 124 or 126 may receive ACR fingerprint information from one of the electronic devices 115 and may match the received fingerprints with those generated by the ACR fingerprint server 105. When a match occurs and the ACR system 124 or 126 identifies content, the ACR system 124 or 126 may notify the electronic device 115 of the ACR events. The electronic device 115 may communicate ACR event information to the content manager 122. Alternatively, or additionally, the ACR system 124 or 126 may directly communicate the ACR events to the content manager 122. The ACR event fingerprint information may include: information indicating the advertisements in the local content feed; information indicating selected or flagged content in the local content feed; or information indicating a change of a content channel at the electronic device 115 to new media content.

The ACR event information from the different ACR systems 124 and 126 may be in different formats and the content manager 122 may normalize the data into a common format. The content manager 122 can store the normalized data into a database 123. For example, the content manager 122 may receive disparate data sets from the ACR systems 124 and 126, the disparate data sets including similar but not identical data, such as data with the same content but formatted differently. The content manager 122 can process and reformat the disparate data sets to create a single data model or format (e.g., reformatted data sets). The content manager 122 can store the reformatted data sets in the database 123.

In one embodiment, to normalize disparate data sets from ACR systems 124 and 126, the content manager 122 may remove or filter data in the data sets. For example, some data sets may include fields or data that may be irrelevant to the content manager 122. In this example, the content manager 122 may remove or filter the irrelevant data. In another embodiment, to normalize the disparate data sets from ACR systems 124 and 126, the content manager 122 may map fields of the data sets. For example, when the content manager 122 receives a first data set from the ACR system 124 and a second data set from the ACR system 126, at least some of the data fields of the first data set and the second data set may be common to both the first data set and second data set. However, the common data fields may be located at different places in the first data set and second data set. In this example, the content manager 122 may map the different data fields of the first data set and second data set to normalized fields and have the same data fields in the same data field locations in the database 123.

In another embodiment, to normalize disparate data sets from the ACR systems 124 and 126, the content manager 122 may derive data from the data sets. For example, data from the ACR systems 124 and 126 may not include all of the fields that are needed to fill the data fields in the database. However, the content manager 122 may use other fields in the data sets from the ACR systems 124 and 126 to derive data for these data fields.

In one example, the database 123 may include data fields for such as a state in a country field, a designated market area (DMA), and a county and/or city field but the data sets from the ACR systems 124 and 126 may only include zone improvement plan (ZIP) codes. In this example, the content manager 122 may use the ZIP codes to derive data for the fields in the database. In another example, the data set may not include any geographic location information, but may include an internet protocol (IP) address of the ACR systems 124 and 126. In this example, the content manager 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content manager 122 with the IP address of the electronic devices 115. The content manager 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In one embodiment, the content manager 122 may use the normalized data to generate reports or data (viewing data) about user's viewing behavior across different ACR technology vendors and smart TV or other Internet-connected video devices. The content manager 122 and the electronic devices 115 may include communications interfaces to communicate information, such as overlay content, between the electronic devices 115 and the content manager 122. In one example, the communication interface may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 may instruct the electronic devices 115 to replace portions of the local content feed received from the OTA broadcaster 108 or the MVPD 110 with overlay content. In another example, the content manager 122 may instruct the electronic devices 115 to overlay or superimpose overlay content onto portions of the local content feed. The content manager 122 may aggregate ACR event information across multiple ACR systems 124 and 126 and may communicate overlay content to different electronic devices 115 (such as electronic devices from different device manufacturers).

The content manager 122 may also establish communication connections with other devices 116. In one example, the other devices 116 may communicate with the electronic devices 118 and 120 and provide an additional screen (e.g., a second screen) to display overlay content. For example, the electronic devices 118 and 120 may receive the local content feed from the OTA broadcaster 108 or the MVPD 110 and display the local content feed to a viewer. The other devices 116 may also communicate ACR event information to the ACR systems 124 and 126 when an ACR event occurs, as discussed in the preceding paragraphs. When the content manager 122 receives the ACR event information, the content manager 122 may communicate overlay content to the other devices 116.

In one example, the electronic devices 118 and 120 may continue to display the local content feed while the other devices 116 display the overlay content. In another example, the electronic devices 118 and 120 and the other devices 116 may both display the overlay content. In another example, the electronic devices 118 and 120 and the other devices 116 may display a portion of the overlay content and a portion of the local content feed. In another example, the electronic devices 118 and 120 and the other devices 116 may display different local content feeds and different overlay content.

In one example, the electronic devices 118 and 120 and/or the other devices 116 may display the overlay content at the time the electronic devices 118 and 120 and/or the other devices 116 receive the overlay content. In another example, the electronic devices 118 and 120 and/or the other devices 116 may delay displaying the overlay content for a threshold period of time. In one embodiment, the threshold period of time may be a predefined period of time. In another embodiment, the content manager 122 may select a period of time for the electronic devices 118 and 120 and the other devices 116 to delay displaying the overlay content.

Figure 2:
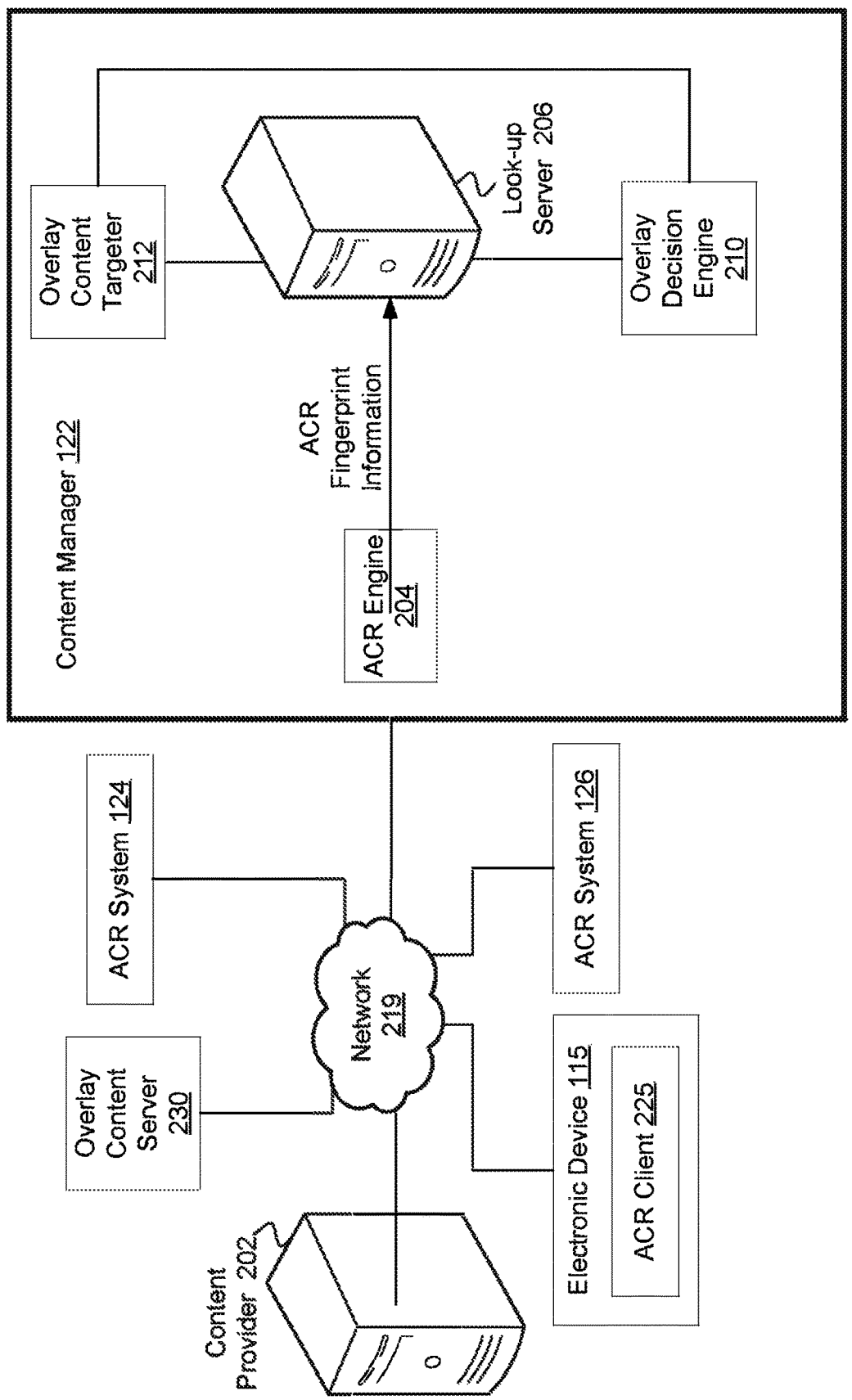
FIG. 2 illustrates a system diagram of a content overlay network with a content manager in communication with an automatic content recognition (ACR) client of an electronic device according to one embodiment.

FIG. 2 illustrates a system diagram of a content overlay network 200 with a content manager 122 in communication with an ACR client 225 of an electronic device 115 that performs fingerprint matching locally on the electronic device 115 according to one embodiment. Some numbers in FIG. 2 are similar to some numbers in FIG. 1 as noted by similar reference numbers unless expressly described otherwise.

A content provider 202 may stream media content to the electronic device 115 over a network 219, where the content manager 122 may intercept the streaming before or simultaneously to the content provider 202 streaming of the media content to the electronic device 115. For example, the content manager 122 may receive a copy of the media content and the electronic device 115 can receive the media content. The content manager 122 may also communicate with an overlay content server 230. In one example, the content manager 122 can send the overlay content server 230 an AD call that requests an AD be served with the media content to target the subject matter of the media content and/or interests of a viewer. In another example, the content manager 122 can send the overlay content server 230 an AD call that requests an AD be served as an overlay to the media content to target the subject matter of the media content and/or interests of the viewer.

The content manager 122 may include an ACR engine 204, a look-up server 206, an overlay decision engine 210, and an overlay content targeter 212. The content provider 202 may upload overlay content to the ACR engine 204. In one embodiment, the ACR Engine 204 can receive ACR event information from the electronic devices 115. The ACR Engine 204 can determine events associated with the fingerprints to enable the content manager 122 to select overlay content based on the events. In another embodiment, the ACR engine 204 may fingerprint the overlay content. For example, the ACR engine 204 may generate a fingerprint for a frame of a feed by performing a discrete cosine transform (DCT) of the frame and designating a subset of the resulting coefficients (e.g., the low-frequency coefficients) as the fingerprint. In one embodiment, the ACR engine 204 may generate fingerprints by fingerprinting every frame of a feed. In another embodiment, the ACR engine 204 may generate fingerprints by fingerprinting every other frame of the feed. In another embodiment, the ACR engine 204 may generate fingerprints by fingerprinting a sequence of frames. In another embodiment, the ACR engine 204 may generate fingerprints by periodically fingerprinting the frames. In another embodiment, fingerprints may be generated by fingerprinting the frames at predetermined times.

The ACR engine 204 may communicate ACR fingerprints to the look-up server 206. The look-up server 206 may look-up media content in a database stored at the look-up server 206. In one embodiment, the look-up server 206 identifies media content. In another embodiment, the look-up server 206 identifies a location within the media content corresponding to an ACR event received from the ACR system 124 or 126. In one embodiment, the ACR event can be when an input device (such as a remote) changes a media content channel on an electronic device to new media content (e.g., changing from TV channel 3 to TV channel 4). In another embodiment, the ACR event can be when an ACR system 124 or 126 matches a fingerprint for the media content with a tagged fingerprint in the series of fingerprints from the ACR system 124 or 126 that the electronic device 115 is currently displaying.

Each fingerprint for a segment of the feed may be associated with a time stamp. The time stamp may belong to individual frames of the segment of the feed as the ACR engine 204 receives the frames. The time stamp may be a frame number within the feed with an arbitrary starting point. The look-up server 206 may store the fingerprints in association with their respective time stamps. In one embodiment, the time stamps can have a microsecond format. The overlay content targeter 212 can use the time stamp to identify an AD to overlay or replace a media content with on a frame-by-frame basis because the fingerprints are time stamped at a microsecond level. In one embodiment, the overlay content targeter 212 can receive requests from the ACR engine 204 for overlay content to superimpose onto media content. The ACR engine 204 can look up a list of different overlay content or replacement videos associated with the media content in a database and send the list to the overlay content targeter 212. The overlay content targeter 212 can select overlay content or a replacement video from the list and send the overlay content or the replacement video to the ACR engine 204 for the on the electronic devices 115 to display.

In another embodiment, the ACR engine 204 interacts with the ACR client 225 of the electronic device 115. The ACR client 225 can include processing logic or a processing device to execute instructions or perform processes. The electronic device 115 may include an ACR client 225 that may communicate viewer fingerprint information to the look-up server 206 periodically or continuously, such as continuously while an ACR event occurs. The look-up server 206 may determine when there may be a match between the ACR fingerprint information (stored at the look-up server 206, for example) and the viewer fingerprint information. When there is a positive match, the look-up server 206 may communicate a positive match indicator to the ACR client 225. The ACR client 225 may send an overlay request to an overlay decision engine 210 requesting overlay content.

In one example, the overlay request may include a content identifier (ID). In one embodiment, the content ID can be an ID identifying a type of overlay content. In another example, the overlay request may include overlay information or overlay parameters (as discussed in the proceeding paragraphs). In another embodiment, the overlay information can include overlay content or targeting information. In another embodiment, the overlay parameter can include call-to-action options. In one example, the call-to-action options can include configuration information for a user interface of the electronic device that receives feedback associated with the overlay content or the media content. In another example, the call-to-action options can include restriction information that restricts selection of overlay content. In one example, the overlay decision engine 210 may use the content ID, overlay information, or overlay parameters to identify overlay content.

In another example, the overlay decision engine 210 may use the content ID, overlay information, and/or overlay parameters to identify an overlay format. The overlay decision engine 210 may compare the content ID, overlay information, or overlay parameters with an overlay database to identify the overlay content and/or the overlay format. A content provider or an advertiser may use a graphical user interface (GUI) or other interface to send and update the overlay database with new overlay content and/or overlay formats on a periodic or continuous basis.

When the overlay decision engine 210 identifies the overlay content, the overlay decision engine 210 may return the overlay content to the electronic device 115. In one example, the overlay decision engine 210 may communicate the overlay content directly to the electronic device 115, such as via a wireless communication network. In another example, the overlay decision engine 210 may communicate the overlay content to the electronic device 115 via a universal resource locator (URL). In one example, when multiple overlay contents match the content ID, overlay information, and/or overlay parameters, the overlay decision engine 210 may select the targeted content overlay that meets a greatest number parameters and/or other information (e.g., greater than the other overlay content). In another example, when multiple overlay contents match the content ID, overlay information, and/or overlay parameters, the overlay decision engine 210 may randomly select an overlay content that meets the parameters and/or other information. In another example, when multiple overlay contents match the content ID, overlay information, and overlay parameters, the overlay decision engine 210 may select predetermined overlay content that matches the content ID, overlay information, and/or overlay parameters. The overlay content may be populated with dynamic content (e.g., content that may be updated or refreshed at periodic intervals). The dynamic content may be stored in a local database or an external system.

The ACR client 225 of the electronic device 115 may superimpose overlay content over the media content of the content feed when the ACR fingerprint information matches the user fingerprint information. In one example, the electronic device 208 may superimpose overlay content over the media contact of the content feed in a hypertext markup language (HTML) browser. In another example, the electronic device 208 may superimpose overlay content over the media content of the content feed from an OTA broadcaster or a cable broadcaster. When the electronic device 115 superimposes overlay content onto the media content, a display of the electronic device 115 may display the overlay content to the viewer. In one example, the overlay content may include one or more call-to-action options that the electronic device 115 displays to a user. In this example, the user may interact with the overlay content using an input device (such as a TV remote, keyboard, a smartphone, or a tablet) to create feedback information. The ACR client 225 may communicate the feedback information to an overlay content targeter 212. The overlay content targeter 212 may analyze the feedback information to determine desired information, such as a user interest level in the overlay content.

In one embodiment, the ACR client 225 monitors the content feed to determine when the fingerprints of the overlay content and the media content of the content feed cease to match. In another embodiment, the ACR client 225 determines when a threshold period of time expires after the fingerprints of the overlay content and the media content of the content feed match. In one example, when the overlay content and content feed match ceases and/or a threshold period of time expires, the electronic device 115 may cease to superimpose the overlay content for display on the electronic device 115.

In one embodiment, the ACR client 225 may perform the fingerprint matching locally for a portion of the fingerprints. In another embodiment, the ACR client 225 may perform all of the fingerprint matching locally. For example, the ACR client 225 may perform the fingerprinting locally on the electronic device 208, instead of on a server, such as the look-up server 206. The ACR operations described may be used in context other than the overlay system context. For example, the local ACR fingerprint matching by the ACR client 225 may be used in other systems.

Figure 3A:
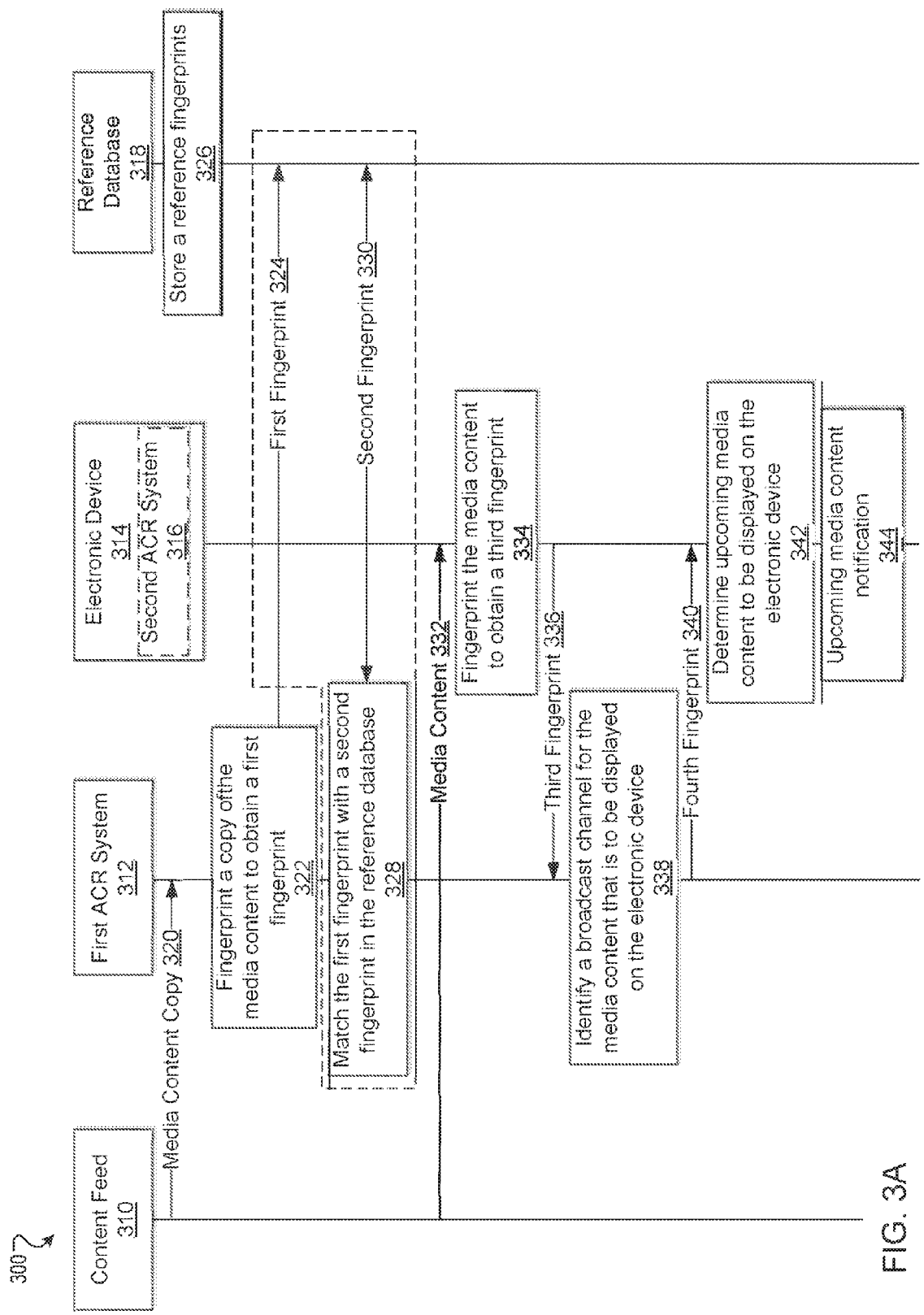
FIG. 3A illustrates a diagram of a method for notifying an electronic device of upcoming content to be displayed according to one embodiment.

FIG. 3A illustrates a diagram of a method 300 for notifying an electronic device 314 of upcoming content to be displayed according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed, at least in part, by the content distribution network 100 of FIG. 1 or by all or part of the content overlay network 200 of FIG. 2.

Referring to FIG. 3A, the method 300 begins with receiving, at a first ACR system 312, a copy of media content from a content feed 310 (320). For example, the first ACR system 312 can be connected to the electronic device 314 via a first network connection, wherein the electronic device 314 is to receive the media content from a content source device over a second network connection between the content source device and the electronic device 314. The first ACR system 312 can include a third network connection to a content feed to receive a copy of the media content from the content feed via the third network connection.

In one embodiment, the first ACR system 312 can be the ACR system 124 (FIG. 1 or FIG. 2). In another embodiment, the first ACR system 312 can be the ACR system 126 (FIG. 1 or FIG. 2). In one example, the media content can be live broadcast content from a live broadcast feed of a content provider 102 (FIG. 1 or FIG. 2). In another example, the media content can be video-on-demand content or other time-shifted media content. The method can include fingerprinting, by the first ACR system 312, the copy of the media content to obtain a first fingerprint (322). The method can include storing, at a reference database 318, the first fingerprint (324). The reference database 318 can store reference fingerprints for various media content. Reference fingerprints can be fingerprints for the various media content that the first ACR system 312 previously fingerprinted. The first ACR system 312 can use the reference fingerprints to identify media content by comparing one or more of the reference fingerprints the reference database 318 with a fingerprint of media content of the content feed 310. The fingerprinting the media content from the content feed 310 to obtain the first fingerprint and storing the first fingerprint can be referred to as ingesting a content feed or indexing the media content.

The method can include matching the first fingerprint with a second fingerprint in the reference database 318 (328). The second fingerprint can be a reference fingerprint from previously indexed media content. For example, the first ACR system 312 can fingerprint various media content (such as video advertisements, television shows, and films) to obtain the second fingerprint. The first ACR system 312 can add the second fingerprint obtained from the various media content to the reference database 318 for subsequent matching to the first fingerprint. To match the first fingerprint to the second fingerprint, the first ACR system 312 can search the reference fingerprints of the reference database 318 to find a reference fingerprint that matches the first fingerprint (330). In one example, the first ACR system 312 can match the first fingerprint against the second fingerprint to identify media content segments the second ACR system 316 will replace with overlay content, as discussed in the proceeding paragraphs. In one embodiment, the first fingerprint can be stored at the reference database 318 (324) in parallel as the first fingerprint can be matched with the second fingerprint (328 and 330). In one embodiment, the first fingerprint can be stored at the reference database 318 (324) at the same time as the first fingerprint can be matched with the second fingerprint (328 and 330). In another embodiment, the first fingerprint can be with matched second fingerprint (328 and 330) and then the first fingerprint can be stored at the reference database 318 (322), or vice versa.

The method can include receiving, at a second ACR system 316, media content from the content feed 310 (332). The media content can be media content a display of the electronic device 314 will display to a viewer at a future point in time. In another embodiment, the second ACR system 316 can be integrated into the electronic device 314. In one example, the second ACR system 316 can be part of the second ACR client 225 of the electronic device 115 (FIG. 2). In another example, the second ACR system 316 can be integrated into the electronic device 116 (FIG. 1), such as a mobile device or smart TV. In another embodiment, the second ACR system 316 can be a separate device that is coupled to the electronic device 118 or 120 (FIG. 1), such as a dongle or a set top box. The method can include fingerprinting the media content using the second ACR system 316 to obtain a third fingerprint (334).

The method can include sending the third fingerprint to the first ACR system 312 (336). The method can include identifying a broadcast channel for the media content that the electronic device 314 will display (338). The electronic device 314 can identify a broadcast channel by comparing the first fingerprint with the third fingerprint. For example, the first ACR system 124 or 126 (FIG. 1) can compare the first fingerprint with the third fingerprint. When there is a match, the first ACR system 124 or 126 can identify the broadcast channel that correlates to the third fingerprint for the media content the electronic device 115 is displaying. In this example, the electronic device 115 fingerprints the media content and sends the third fingerprint to the first ACR system 124 or 126. The first ACR system 124 or 126 can match the third fingerprint with the second fingerprint in the reference database 125 or 127 to recognize the media content the electronic device 115 is displaying. The first ACR system 124 or 126 can recognize the electronic device 115 is displaying media content for a TV channel.

The method can include sending a fourth fingerprint 340 from the first ACR system 312 to the second ACR system 316 (340). In one example, the fourth fingerprint 340 can be a fingerprint for upcoming media content that the electronic device 314 is to display. Upcoming media content can be media content that is scheduled to be displayed on the electronic device 314 at a future point in time (such as in a few seconds in the future). For example, when managing an insertion of content (such as ADs) for on-demand, the timing for advertisement insertion for video-on-demand (VOD) content may be very flexible. In one embodiment, the VOD content may be a previously recorded broadcast. The timing for advertisement insertion for media content from a "live" broadcast may be less flexible. For example, the time window may be narrow for insertion between a point in time that a broadcaster broadcasts the media content and a point in time that a viewer sees the live broadcast, because the broadcast is not prerecorded and the broadcaster sends it near the time the live event occurs.

Live can mean that the media content is anchored to a point in time for playing the media content. For example, a media player can schedule a beginning of the piece of media content to play at a particular point in time. In one embodiment, the media player plays the media content of the live event at the same time as the media content is encoded. The anchor point is the time that the encoding of the event began. In another embodiment, there is a gap or latency window between the time the live event occurs and the media content of the live event being played (such as a small window to edit content) and the anchor point is the time that the encoding of the event began plus the latency window. In another embodiment, the media content of a live event may be pre-encoded, but scheduled to play out at a particular point in time. The playback of the content for live events occupies approximately the same amount of time as the original live event, in order to keep the playback of the media content synchronized with the schedule. For live playback, the duration of advertisement breaks during playback should approximate the duration of the advertisement breaks as they were encoded.

Live playback differs from VOD playback because VOD content has no anchor point in real time. A piece of VOD content begins playing when a viewer requests the VOD content. In one embodiment, the duration of advertisement breaks during VOD can be the same as the duration of the original advertisement breaks. In another embodiment, the duration of the advertisement breaks during the VOD is different than the original broadcast. For example, a broadcaster can broadcast original media content to an electronic device to display with the original content whereas the electronic device can display the VOD content without the original advertisements in the original television broadcast. Where the VOD content is not anchored to a particular schedule, the advertisements in the VOD content may not match the duration of the original advertisements.

In another example, the fourth fingerprint 340 can be a series of upcoming fingerprints for the media content the electronic device 314 is to display. In one embodiment, the second ACR system of the second ACR client 225 (FIG. 2), can receive an upcoming fingerprint for the upcoming media content to be displayed on the electronic device 115. In another embodiment, the second ACR system of the second ACR client 225, can receive a series of upcoming fingerprints for a period of time (such as the next 5-10 seconds) for the upcoming media content the electronic device 314 is to display. The method can include the second ACR system 316 determining the upcoming media content the electronic device 314 is to display using the fourth fingerprint (342).

The method can include the second ACR system 316 sending a notification to a content overlay system of the electronic device 314 indicating upcoming media content (344). In response to the notification, the content overlay system can replace the upcoming content with overlay content. For example, when the second ACR system 316 determines the upcoming content the electronic device 314 is to display, the second ACR system 316 can send the notification. In one embodiment, the notification can identify a media content segment of the media content that the electronic device 314 is to display. In another embodiment, the electronic device 314 or the second ACR system 316 can use the notification to determine whether to display a content overlay.

In another embodiment, when the electronic device 314 receives the notification, the electronic device 314 can send an alert of the upcoming content to a mobile device that is paired to the second ACR system 316. For example, when the electronic device 314 receives the notification that indicates that the electronic device 314 will display a commercial at a future point, the electronic device 314 can alert the mobile device regarding the upcoming commercial. In response to receiving the notification, the mobile device can display a coupon, a website link, or other content associated with the commercial when the electronic device 314 displays the commercial. In another example, when the electronic device 314 receives the notification that indicates that the electronic device 314 will display a commercial at a future point, the electronic device 314 can alert the mobile device regarding the upcoming commercial. The mobile device can display the commercial or other content associated with the commercial to ensure that the user sees the content, such as in the event that the viewer is looking at their mobile device during the commercial. In another embodiment, when the electronic device 314 receives the notification, the electronic device 314 can send a trigger to the mobile device to display overlay content (such as an AD) on a user's social media feed. In this example, the display of the overlay content on a user's social media feed can be synchronized with displaying the overlay content on the electronic device 314.

In one example, an input device (such as a remote control) can a broadcast channel for the media content the electronic device 314 is displaying from TV channel 3 to TV channel 4. In one embodiment, the second ACR system 316 can detect that the fourth fingerprint received no longer matches the current media content the electronic device 314 is displaying. In another embodiment, the second ACR system 316, can detect that a series of upcoming fingerprints (e.g., fourth fingerprints) received from the first ACR system 312 no longer matches fingerprints for the current media content being displayed on the electronic device 314.

In response to the fourth fingerprint(s) no longer matching fingerprints for the current media content, the electronic device 314 can then send a new fingerprint or a series of new fingerprints for the current media content to the first ACR system 312. The first ACR system 312 can identify the media content of the current broadcast channel. For example, the first ACR system 312 can determine that the electronic device 314 is currently displaying media content from TV channel 4. The first ACR system 312 can then send a new fourth fingerprint for the media content on TV channel 4 or series of fourth fingerprints for channel 4 for the next 5-10 seconds of the media content on TV channel 4. The electronic device 314 can continue to match the current media content the electronic device 314 is displaying with the new fourth fingerprint or the series of fourth fingerprints from the first ACR system 312. When the new forth fingerprint matches the fingerprint for the media content the electronic device 314 is displaying, the electronic device 314 can request a new fingerprint from the first ACR system 312 for the upcoming media content. In another embodiment, when the electronic device 314 reaches the end of a series fingerprint, the electronic device 314 can request a next series of fingerprints from the first ACR system 312.

The fingerprinting the media content, comparing the first fingerprint with the third fingerprint, and determining the upcoming content to be displayed can be referred to as matching the media content. The matching the media content and indexing the media content can be done at the same time or in parallel, e.g., matching while indexing. One advantage of matching while indexing is to determine analytics regarding the media content and the displaying of the media content. In one example, the analytics can include a count of how many media channels (such as TV channels) aired specific commercials or other media content. In another example, the analytics can include an indication of which media channels aired specific commercials or other media content.

Another advantage of the matching while indexing is that the second ACR system 316 of the electronic device 314 can detect that a display of the electronic device 314 is displaying media content that has the media content to be replaced in a few seconds. In one embodiment, there is a time delta or latency period between a content provider 102 (FIG. 1) sending media content to the electronic device 314 and the electronic device 314 receiving the media content. For example, there is a latency period of approximately 8 seconds between the content provider 102 sending media content to the electronic device 314 and the electronic device 314 receiving the media content for OTA broadcasting. In another example, there is a latency period of approximately 10-15 seconds between the content provider 102 sending media content to the electronic device 314 and the electronic device 314 receiving the media content for satellite or cable transmissions. The first ACR system 312 can perform the indexing during the latency period that the electronic device 314 is waiting to receive the media content. When the electronic device 314 receives the media content, the electronic device 314 can also store a fingerprint for the media content.

In one example, the electronic device 314 can use the upcoming fingerprint for the channel the electronic device 314 is displaying to anticipate the media content the electronic device 314 is to display at a future point in time, such as in a few second. When the electronic device 314 identifies the media content that is to be displayed at the future point in time, the electronic device 314 can buffer the overlay content in advance of the time it is to replace current media with the overlay content.

The reference to a singular fingerprint is not intended to be limiting. The fingerprints as discussed herein can refer to a single fingerprint, a series of fingerprints, or a set of fingerprints. For example, processing logic of the first ACR system 312 can fingerprint a fingerprint or a set of fingerprints.

Figure 3B:
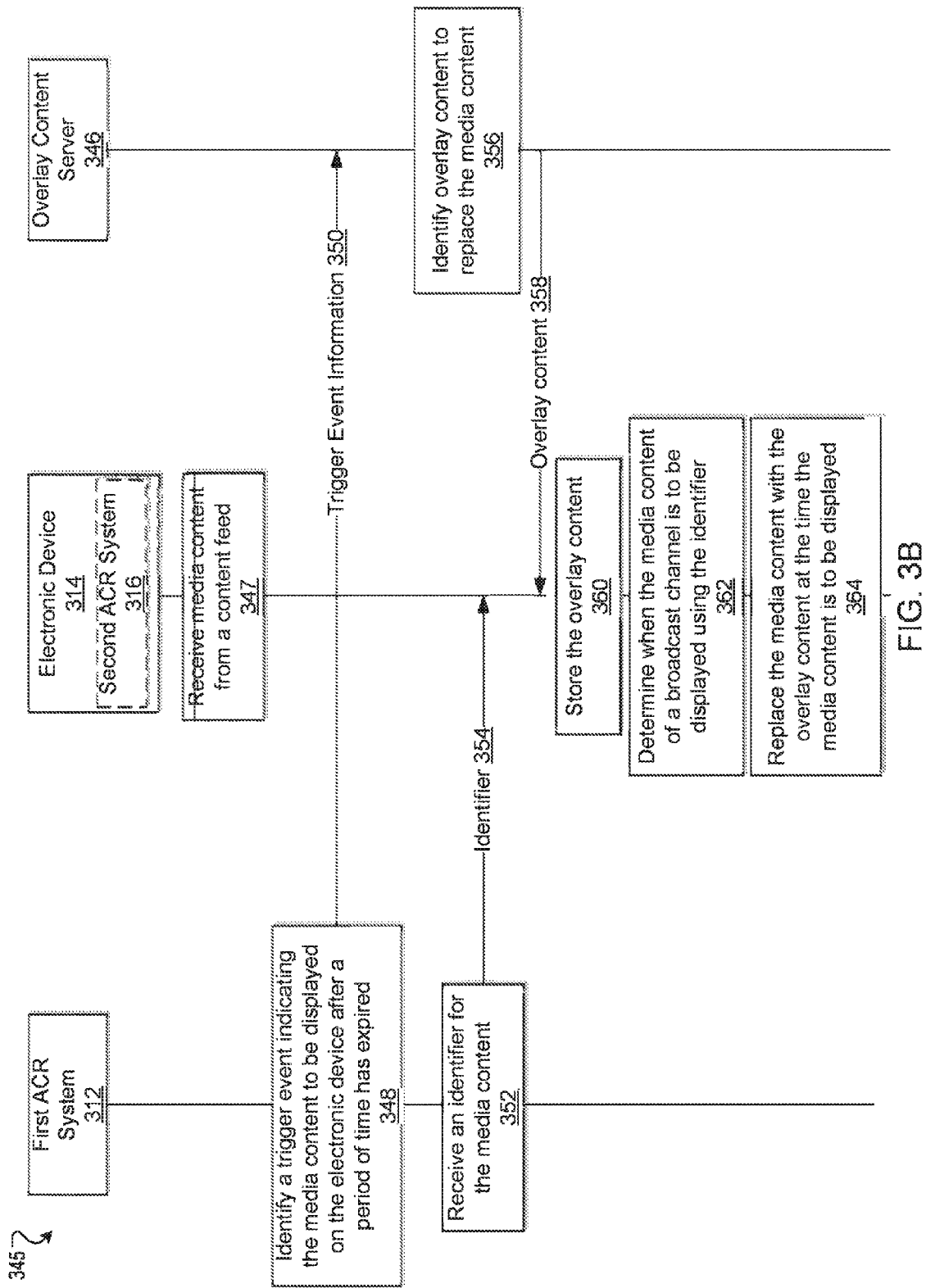
FIG. 3B illustrates a diagram of a method for replacing a first media content with a second media content according to one embodiment.

FIG. 3B illustrates a diagram of a method 345 for replacing a media content with overlay content according to one embodiment. The method 345 may at least partially performed by processing logic that includes hardware (e.g., circuitry, dedicated logic, programmable logic, microcode, etc.), software (e.g., instructions executed by a processing device), firmware or a combination thereof. The method 345 may be performed by all or part of the content distribution network 100 of FIG. 1 or by all or part of the content overlay network 200 of FIG. 2. Some components of FIG. 3A are similar to some components of FIG. 3B as noted by similar reference numbers unless expressly described otherwise.

Referring to FIG. 3B, the method 345 begins with the first ACR system 312 receiving media content on a broadcast channel from a content feed (347). The method can include a first ACR system 312 identifying a trigger event indicating the media content that the electronic device 314 is to display after a period of time has expired (348). In one embodiment, the trigger event can be when a device (such as a remote control) or an interface changes a media content channel on the electronic device 314. For example, the trigger event can be the changing of the electronic device 314 from TV channel 3 to TV channel 4, as discussed in the preceding paragraphs. In one embodiment, the first ACR system 312 can determine that the electronic device 314 is displaying TV channel 4 and send a series of fingerprints for 5-10 seconds associated with the upcoming media content. The second ACR system 316 can use the series of fingerprints to predict what the electronic device 314 is to display at a future point in time and anticipate a replacement of the media content with overlay content. In another embodiment, the trigger event can be when the second ACR system 316 matches a fingerprint for the media content the electronic device 314 is currently displaying with a tagged fingerprint in the series of fingerprints. For example, the tagged fingerprint can be flagged by the second ACR system 316 to indicate that media content that is to be replaced will be displayed at a later point in time, such as in 5 seconds. When the second ACR system 316 matches the fingerprint for the media content the electronic device 314 is currently displaying with a tagged fingerprint, the second ACR system 316 can identify a trigger event.

The method can include the overlay content server 346 receiving trigger event information 350 of the trigger event from the first ACR system 312 (350). The method can include the first ACR system 312 receiving an identifier for the media content (352). In one example, the identifier can include metadata for the media content. In another example, the first ACR system 312 can retrieve schedule data for a content feed in parallel with indexing the media content (as discussed in the preceding paragraphs). The schedule data can be associated with reference fingerprints for the media content. A server or a database can provide the schedule data. In one example, the server or the database can execute software to provide a schedule service. The schedule service can include determining schedule data. In one example, the schedule data can include a schedule of air times of media content or commercials. In another example, the schedule data can include data obtained from a third-party server or database, such as a third-party server or database executing the schedule service. In another example, the schedule data can include data obtained directly from a broadcaster system via internal scheduling systems of the broadcaster system. The sources of the metadata or identifier are not intended to be limiting. The metadata can be received from a variety of different sources to provide additional schedule metadata and a higher granularity of schedule metadata. In one example, the second ACR system 316 can receive the schedule data for the electronic device 314 when a broadcast channel is identified. In another example, the second ACR system 316 can receive the schedule data in parallel to the second ACR system 316 receiving upcoming fingerprints corresponding to that broadcast channel.

The method can include the second ACR system 316 receiving the identifier from the first ACR system 312 (354). The method can include identifying, by the overlay content server 346, overlay content to replace the media content (356). In one example, identifying the overlay content includes identifying the overlay content that is associated with the trigger event information or the media content. In another example, identifying the overlay content includes identifying the overlay content that is associated with a unique identifier (UID) for the electronic device 314. In this example, the overlay content can be targeted or personalized content for a viewer. The overlay content server 346 can use the UID of the electronic device 314 to retrieve metadata including: information about the electronic device 314, information about a household associated with the electronic device 314, information about persons in the household associated with the electronic device 314, and so forth.

The method can include the electronic device 314 receiving the overlay content from the overlay content server 346 (358). For example, the overlay content server 230 can use the trigger event information to select and send overlay content that is targeted or personalized to the viewer or the household associated with the electronic device 314 (e.g., relevant overlay content).

The method can include the electronic device 314 storing the overlay content at a memory device (360). In one example, the memory device can be integrated into the electronic device 314. In another example, the memory device is coupled to the electronic device 314. In another example, the memory device can temporarily store the overlay content (e.g., buffer the overlay content). An advantage of temporarily storing the overlay content is to decrease a size of the memory for the memory device. For example, the memory device or the electronic device 314 can delete the overlay content after the second ACR system 316 has replaced the media content with overlay content. In another example, the memory device can permanently store the overlay content. An advantage of permanently storing the overlay content can be to eliminate retrieving the overlay content again when the second ACR system 316 replaces other media content with overlay content.

The method can include the second ACR system 316 replacing the media content with the overlay content at the time the media content is displayed (364). An advantage of replacing the media content with the overlay content at the time the media content is to be displayed is that the overlay content can be overlayed or be shown immediately at a beginning of the media content being displayed, such as at a beginning of an advertisement or a commercial.

Figure 4:
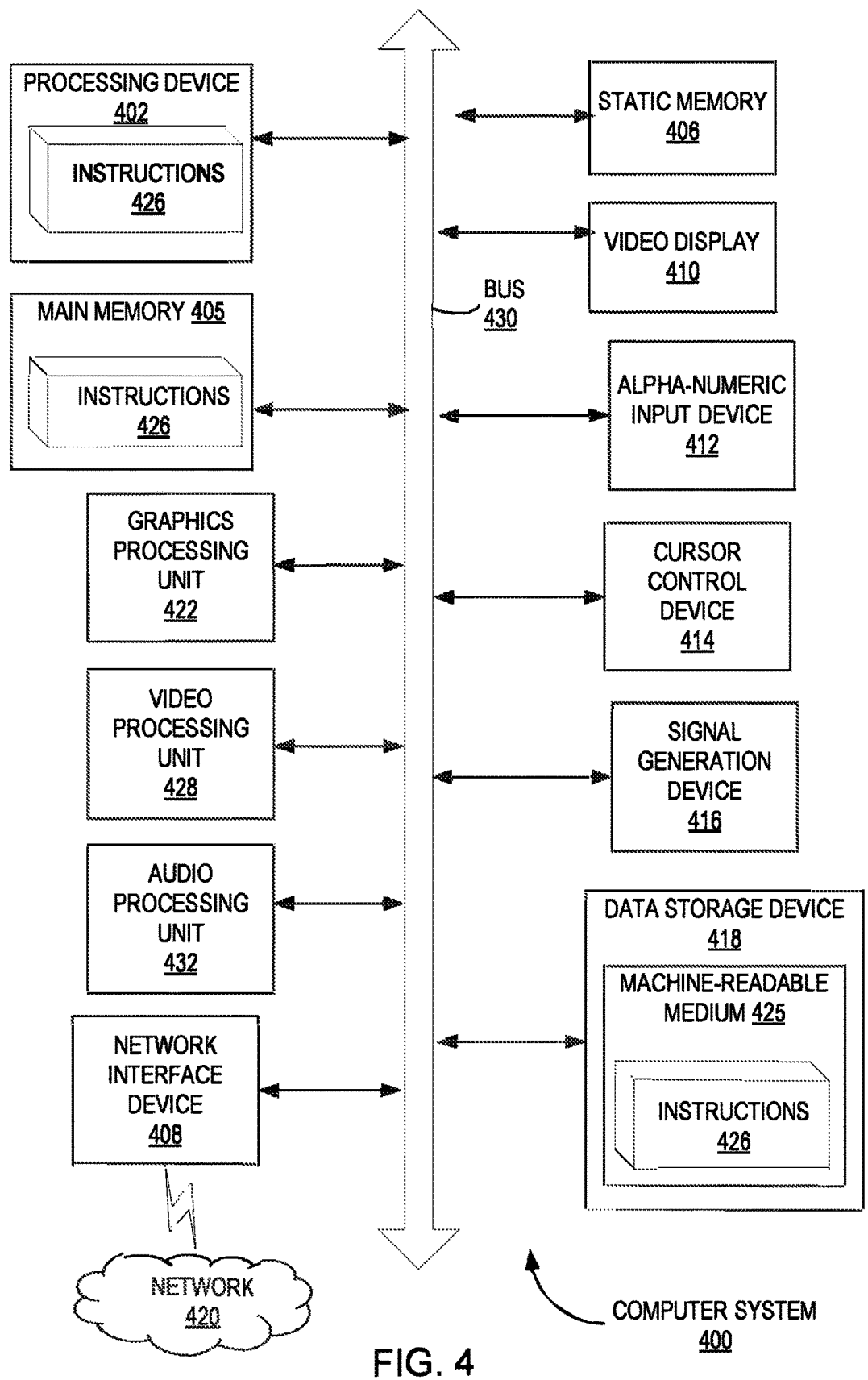
FIG. 4 illustrates a diagrammatic representation of a machine in the example form of a computer system within which a set of instructions, for causing the machine to perform any one or more of the methodologies discussed herein, may be executed.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or an electronic device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 may correspond to the ACR fingerprinter server 105 of FIG. 1. The computer system 400 may correspond to all or part of the content distribution network 100 of FIG. 1 or to all or part of the content overlay network 200 of FIG. 2. The computer system 400 may correspond to at least a portion of a cloud-based computer system such as discussed herein.

The computer system 400 includes: a processing device 402; a main memory 404, such as a read-only memory (ROM); flash memory; dynamic random access memory (DRAM), such as synchronous DRAM (SDRAM) or DRAM (RDRAM); a static memory 406, such as flash memory or static random access memory (SRAM); and a data storage device 418. The processing device 402, the main memory 404, the flash memory, the dynamic random access memory (DRAM), the static memory 406, and the data storage device 418 can communicate with each other via a bus 430.

Processing device 402 represents one or more processing devices. For example, one or more processing devices can be a microprocessor, central processing unit, or the like. More particularly, the processing device 402 may be a complex instruction set computing (CISC) microprocessor, a reduced instruction set computer (RISC) microprocessor, a very long instruction word (VLIW) microprocessor, a processor implementing other instruction sets, or a processor implementing a combination of instruction sets. The processing device 402 may also be one or more special-purpose processing devices. For example, the special-purpose processing devices can be an application specific integrated circuit (ASIC), a field programmable gate array (FPGA), a digital signal processor (DSP), network processor, or the like. In one embodiment, processing device 402 may include one or more processing cores. The processing device 402 may be configured to execute the instructions 426 of a mirroring logic stored in the main memory 405 for performing the operations discussed herein.

The computer system 400 may further include a network interface device 408 communicably coupled to a network 420. The computer system 400 also may include: a video display unit 410, such as a liquid crystal display (LCD) or a cathode ray tube (CRT); an alphanumeric input device 412, such as a keyboard; a cursor control device 414, such as a mouse; a signal generation device 416, such as a speaker; or other peripheral devices. Furthermore, the computer system 400 may include a graphics processing unit 422, a video processing unit 428, and an audio processing unit 432. In another embodiment, the computer system 400 may include a chipset, which refers to a group of integrated circuits, or chips, that is designed to work with the processing device 402. The chipset may control communications between the processing device 402 and external devices. For example, the chipset may be a set of chips on a motherboard that links the processing device 402 to high-speed devices, such as main memory 404 and graphic controllers, as well as linking the processing device 402 to lower-speed peripheral buses of peripherals, such as a universal serial bus (USB), a peripheral component interconnect (PCI), or industry standard architecture (ISA) buses.

The data storage device 418 may include a computer-readable storage medium 425 that stores instructions 426. The instructions 426 may embody any one or more of the methodologies of functions described herein. The instructions 426 may also reside, completely or at least partially, within the main memory 404 and/or within the processing device 402 during execution thereof by the computer system 400. The main memory 404 and the processing device 402 may be computer-readable storage media.

The computer-readable storage medium 424 may store instructions 426 utilizing logic and/or a software library containing methods that call the above applications. While the computer-readable storage medium 424 is shown in an example embodiment to be a single medium, the term "computer-readable storage medium" or "computer-readable medium" is not intended to be limiting. The "computer-readable storage medium" or "computer-readable medium" can be a single medium or multiple media, such as a centralized or distributed database, and/or associated caches and servers, that store the one or more sets of instructions. The term "computer-readable storage medium" can include any medium that is capable of storing, encoding or carrying a set of instruction for execution by the machine and that cause the machine to perform any one or more of the methodologies of the present embodiments. The term "computer-readable storage medium" can include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or laptops and may also be used in other devices, such as handheld devices, tablets, other thin notebooks, systems on a chip (SOC) devices, and embedded applications. Some examples of handheld devices include cellular phones, Internet protocol (IP) devices, smartphones, digital cameras, personal digital assistants (PDAs), and handheld personal computers (PCs). Embedded applications can include microcontrollers, digital signal processors (DSPs), SoCs, network computers (NetPC), set-top boxes, network hubs, wide area network (WAN) switches, or other systems that may perform the functions and operations, as discussed in the proceeding paragraphs.

Although the embodiments described herein may refer to a processor or processing device, other embodiments are applicable to other types of integrated circuits and logic devices. Similar techniques and teachings of embodiments may be applied to other types of circuits or semiconductor devices that may benefit from higher pipeline throughput and improved performance. The embodiments herein are applicable to any processor or machine that performs data manipulations. However, the embodiments are not limited to processors or machines that perform 512 bit, 256 bit, 128 bit, 64 bit, 32 bit, and/or 16 bit data operations and may be applied to any processor and machine in which manipulation or management of data is performed.

The embodiments herein provide examples, and the accompanying drawings show various examples for the purposes of illustration. However, these examples should not be construed to be limiting, as they are merely intended to provide examples of embodiments rather than to provide an exhaustive list of all possible implementations of embodiments.

Some portions of the detailed description are presented in terms of algorithms and symbolic representations of operations on data bits within a computer memory. These algorithmic descriptions and representations are used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

The terms in the preceding paragraphs and similar terms are to be associated with the appropriate physical quantities and are merely convenient labels applied to these quantities. Unless specifically stated otherwise as apparent from the preceding paragraphs and figures, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system registers and memories into other data similarly represented as physical quantities within the computing system memories, computer system registers, other information storage devices, other transmission devices, or electronic devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMS), erasable programmable read only memories (EPROMs), electrically erasable programmable read only memories (EEPROMs), magnetic or optical cards, flash memory, or any type of media suitable for storing electronic instructions. The term "computer-readable storage medium" can include a single medium or multiple mediums that store the one or more sets of instructions. The single medium or multiple mediums can be centralized or distributed databases and/or associated caches and servers. The term "computer-readable medium" can include any medium that is capable of storing, encoding or carrying a set of instructions for execution by the machine and that causes the machine to perform any one or more of the methodologies of the embodiments herein. The term "computer-readable storage medium" can include, but not be limited to, solid-state memories, optical media, magnetic media, or any medium that is capable of storing a set of instructions for execution by the machine and that causes the machine to perform any one or more of the methodologies of the embodiments herein.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description in the proceeding paragraphs. In addition, the embodiments herein are not described with reference to any particular programming language. It will be appreciated that a variety of programming languages may be used to implement the teachings of the embodiments herein.

The preceding description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the embodiments herein. Thus, the specific details set forth above are merely exemplary. Particular implementations may vary from these exemplary details and still be contemplated to be within the scope of the present embodiments.

The preceding description is illustrative and not restrictive. Many other embodiments will be apparent to those of skill in the art upon reading and understanding the preceding description. The scope of the embodiments herein should be determined with reference to the appended claims, along with the full scope of equivalents to which such claims are entitled.

What is claimed is:

1. An automatic content recognition (ACR) system comprising:
    data processing hardware; and
    memory hardware in communication with the data processing hardware, the memory hardware storing instructions that when executed on the data processing hardware cause the data processing hardware to perform operations comprising:
        receiving live media content from a content feed of a broadcaster;
        generating a query fingerprint corresponding to the live media content;
        sending the query fingerprint to a server having stored fingerprints;
        receiving a fingerprint identifier of a corresponding stored fingerprint satisfying the query fingerprint, the fingerprint identifier identifying:
            a broadcast channel associated with the corresponding stored fingerprint; and
            an anchor time point for the broadcast channel corresponding to a time where:
                the live media content is displayed plus a latency time period; and
                overlay content is to be superimposed onto the live media content; and
        causing superimposing of the overlay content over the live media content at the anchor time point.

2. The ACR system of claim 1, wherein the operations further comprise receiving an ACR event.

3. The ACR system of claim 2, wherein the ACR event comprises at least one of the following:
    an indication of advertisements within the content feed;
    an indication of selected or flagged content within the content feed; or
    an indication of a channel change.

4. The ACR system of claim 1, wherein the operations further comprise:
    receiving more than one ACR event, each ACR event comprising event data and a data format;
    normalizing the data format of each received ACR event into a common data format; and
    storing the normalized data format of each received ACR event.

5. The ACR system of claim 4, wherein the operations further comprise filtering the event data.

6. The ACR system of claim 5, wherein the operations further comprise generating a report, the report comprising at least one ACR event or at least one received fingerprint identifier.

7. The ACR system of claim 1, wherein the operations further comprise sending a notification to a mobile device to request that the mobile device display the overlay content onto the live media content at the anchor point.

8. The ACR system of claim 1, wherein the overlay content comprises a coupon, a website link, or additional content.

9. The ACR system of claim 1, wherein the operations further comprise:
    determining whether the live media content changed after generating the query fingerprint; and
    when the live media content changed after generating the query fingerprint, generating a new query fingerprint corresponding to the changed live media content for sending to the server.

10. The ACR system of claim 1, wherein the operations further comprise buffering the overlay content in the memory hardware.

11. A method comprising:
    receiving, at data processing hardware, live media content from a content feed of a broadcaster;
    generating, at the data processing hardware, a query fingerprint corresponding to the live media content;
    sending the query fingerprint from the data processing hardware to a server having stored fingerprints;
    receiving, at the data processing hardware, a fingerprint identifier of a corresponding stored fingerprint satisfying the query fingerprint, the fingerprint identifier identifying:
        a broadcast channel associated with the corresponding stored fingerprint; and
        an anchor time point for the broadcast channel corresponding to a time where:
            the live media content is displayed plus a latency time period; and
            overlay content is to be superimposed onto the live media content; and
    causing superimposing of the overlay content over the live media content at the anchor time point.

12. The method of claim 11, further comprising receiving, at the data processing hardware, an ACR event.

13. The method of claim 12, wherein the ACR event comprises at least one of the following:
    an indication of advertisements within the content feed;
    an indication of selected or flagged content within the content feed; or
    an indication of a channel change.

14. The method of claim 11, further comprising:
    receiving, at the data processing hardware, more than one ACR event, each ACR event comprising event data and a data format;
    normalizing, by the data processing hardware, the data format of each received ACR event into a common data format; and
    storing, by the data processing hardware, the normalized data format of each received ACR event.

15. The method of claim 14, further comprising filtering, by the data processing hardware, the event data.

16. The method of claim 15, further comprising generating, by the data processing hardware, a report, the report comprising at least one ACR event or at least one received fingerprint identifier.

17. The method of claim 11, further comprising sending, by the data processing hardware, a notification to a mobile device to request that the mobile device display the overlay content onto the live media content at the anchor point.

18. The method of claim 11, wherein the overlay content comprises a coupon, a website link, or additional content.

19. The method of claim 11, further comprising:
  determining, by the data processing hardware, whether the live media content changed after generating the query fingerprint; and
  when the live media content changed after generating the query fingerprint, generating, by the data processing hardware, a new query fingerprint corresponding to the changed live media content for sending to the server.

20. The method of claim 11, further comprising buffering, by the data processing hardware, the overlay content in the memory hardware.

\* \* \* \* \*